Patented July 31, 1934

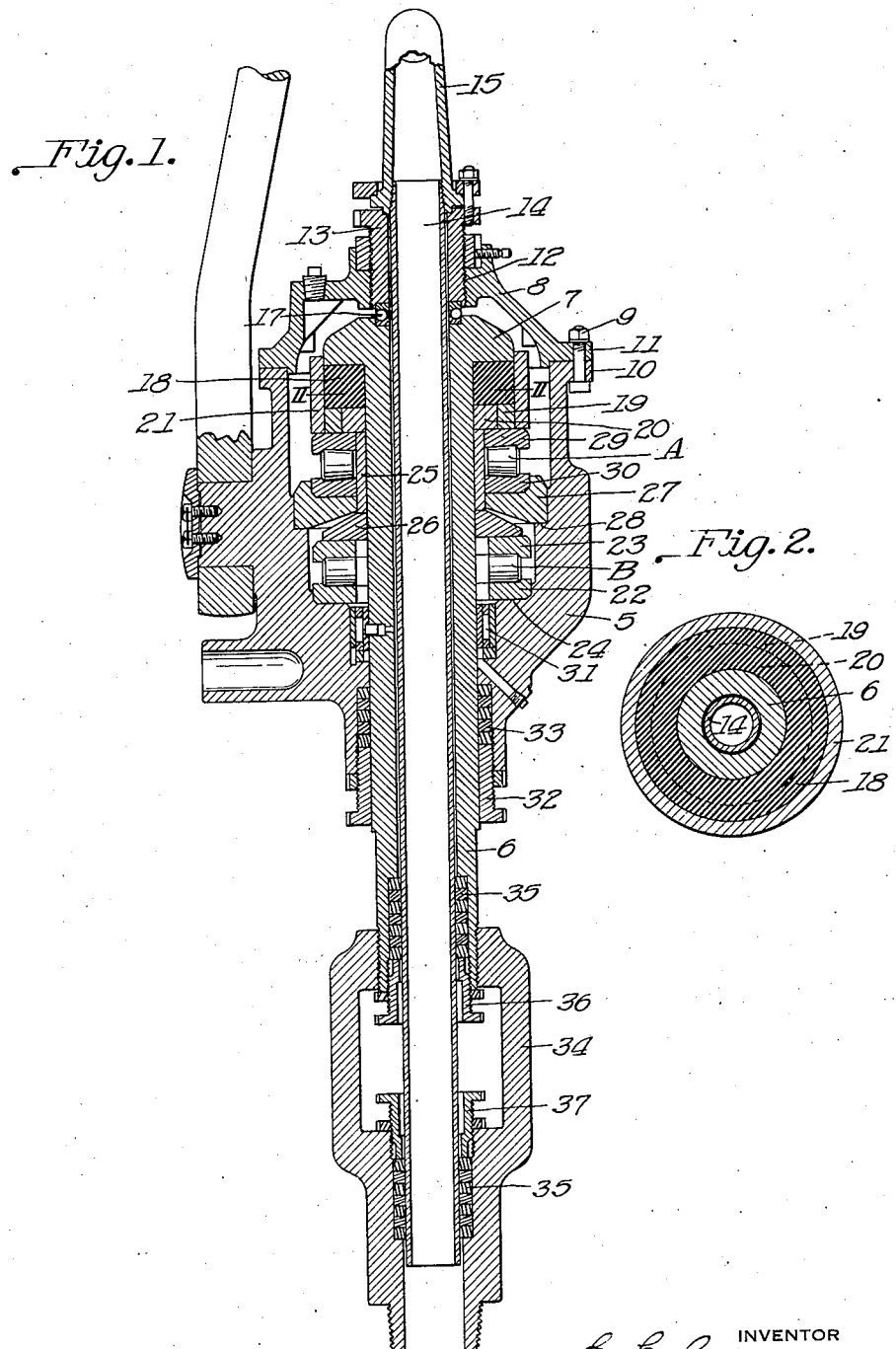

1,968,199

UNITED STATES PATENT OFFICE 1,968,199

EQUALIZING BEARING

Edgar E. Greve, Bellevue, Pa., assignor, by mesne assignments, to Oil Well Supply Company, Pittsburgh, Pa., a corporation of New Jersey Application November 30, 1928, Serial No. 322,607

5 Claims. (Cl. 308—160)

My invention relates to an equalizing bearing construction particularly designed for swivels for rotary drilling apparatus, and while I have shown my invention applied to such swivels and will describe it in connection therewith, it may be advantageously employed for supporting the load on a revolving shaft employed in other structures.

The prime object of the present invention is to provide a load carrying or thrust bearing including a plurality of bearings and means for equalizing the loads on the respective bearings.

In the accompanying drawing, which illustrates an application of my invention:

Fig. 1 is a vertical sectional view of a swivel for rotary drilling apparatus embodying my improved equalizing bearing; and Fig. 2 is a sectional view taken on line II—II of Fig. 1.

Referring to the drawing, the swivel structure, as illustrated, includes a hollow body member 5, a swivel stem or a load carrying rotatable shaft 6 having an abutment member or head 7, preferably formed integral therewith, a cap or top closure member 8 secured to the upper end of the body by bolts 9 passed through flanges 10 and 11 respectively formed on the body and cap members. Cap member 8 is formed with a central opening 12 designed to receive a hollow adjusting plug 13, which latter surrounds a pipe 14 designed to pass mud and water employed in the drilling operation down through the swivel and into the drill pipes. Pipe 14 extends through the body 5 and is connected at its upper end to a goose-neck 15, and, at its lower end 16, it is designed to communicate with a section of a drill pipe, not shown.

Between the head 7 and the adjusting plug or bushing 13, ball bearings 17 are provided. The function of these bearings is to support the upper portion of the swivel or the body, bail, cap, etc., when the bail is disconnected from its supporting means, as when the end of the drill pipe is resting against the bottom of the well. In this position, the bearings 17 take the weight of the body, etc., and serve to prevent friction between the head and the upper part of the swivel.

The rotatable shaft or stem 6 is designed to carry the load and, as this load is considerable, I have provided a plurality of bearings, as illustrated, two sets of roller bearings A and B, and have provided in connection therewith means for transmitting and equally distributing the load from the abutment member or head 7 to the respective bearings.

These means, as illustrated and as preferred, include a member 18 possessing the quality of pliability to such a degree that it may be distorted by variation of pressure on the member, but is not appreciably compressible in the sense of reducing its volume by pressure. Member 18, as shown, comprises a ring of rectangular cross section formed with flat contacting faces; this member being disposed between the lower bearing surface of the head 7 and two annular concentrically assembled load transmitting members 19 and 20.

Both of the load transmitting members 19 and 20 are like the member 18, of substantially rectangular cross section and formed with flat contacting faces, the inner member 20 having a greater cross sectional area than the member 19. 21 designates a metallic ring surrounding the members 18, 19 and 20, and functioning to maintain said members in the desired operative position on the shaft 6.

The lower bearing B, including a bottom plate 22 and a top plate 23, is disposed on a ledge 24 of the body 5. Extending upwardly from the top plate 23, and in effect constituting a part of the said bearing B, is a sleeve 25 disposed on a member 26. Sleeve 25 is designed to support member 20. It will be noted that this construction provides means for transmitting a portion of the load from the head 7, through the member 18 to the bearing B.

The upper bearing A is also disposed within the body and is supported on an annular block 27 carried on a shoulder 28 of the body. Bearing A includes top and bottom wear plates 29 and 30 located between the block 27 and the members 19 and 20. A portion of the load from head 7 will be transmitted through member 18 and ring 19 to the bearing A.

From the foregoing, it will be appparent that equalization of the load on the bearings is effected through the medium of the pliable or elastic non-compressible member 18 which, upon variation occurring in the parts or elements constituting said bearings and the parts disposed between the bearings and the said member 18, member 18 will be distorted due to the lowering or the change of position of either member 19 or member 20. Thus, if member 20 is lowered, a portion of member 18 will be forced to enter into the space formed by the lowering action of the said member 20. This action will, of course, occur in the event of the change of position of member 19.

Mounted between the body and the cylindrical stem, and located just below the bearings B, are vertical roller bearings 31 adapted to take the side thrust of the parts. Between the lower end of the body 5 and a portion of the stem 6, I provide a gland 32 threaded into the body, together with packing means 33 for the purpose of packing off the swivel stem from the body, and thereby retaining the lubricating oil usually placed in the body.

34 designates a coupling member threaded to the lower end of the swivel stem or rotating shaft 6, designed to connect the swivel structure with a section of drill pipe, not shown. This coupling is provided with stuffing boxes, including packing elements 35 and glands 36 and 37, and said coupling member is formed at its lower end with a reduced threaded portion for engagement with a drill pipe section.

While I have found that the member 18 may be advantageously made from suitable rubber or a composition including rubber, my invention is not to be limited to the employment of an elastic element. Any element possessing the quality of pliability or practically incompressible, but capable of being distorted or changing its contour under pressure, may be employed.

I claim:

1. In an equalizing bearing for a revolving shaft, a plurality of bearings, and means for equalizing the load among the bearings comprising walls defining a chamber, a pliable solid substantially filling said chamber, and means transmitting load from each of the bearings to said pliable solid, said solid being distortable by unequal variation in the loads to thereby effect an equalization of the load between the bearings.

2. In an equalizing bearing for a revolving shaft, a plurality of bearings, and means for equalizing the load among the bearings comprising a chamber abutment member, a pliable solid substantially filling said chamber, and means for transmitting the load from said pliable solid to said bearings, said load transmitting means comprising a load transmitting member for each bearing, said solid being distortable by unequal variation in the pressure exerted thereon by the load transmitting members.

3. In an equalizing bearing for a revolving shaft having a chambered abutment member thereon, a plurality of bearings, a pliable solid substantially filling the chamber in said abutment member, and load transmitting members interposed one between each bearing and the pliable solid, said solid being distortable by unequal variation in the pressure exerted thereon by the load transmitting members.

4. In an equalizing bearing for a revolving shaft, a plurality of bearings, and means for equalizing the load among the bearings comprising an abutment member provided with an annular chamber, a pliable solid substantially filling said annular chamber, and annular transmitting members interposed one between each bearing and the pliable solid, said solid being distortable by unequal variation in the pressure exerted thereon by the transmitting members.

5. In an equalizing bearing for a revolving shaft, a plurality of bearings, and means for equalizing the load among the bearings comprising an abutment member provided with a ring member defining an annular chamber, a rubber annulus in said chamber, and annular transmitting members interposed one between each bearing and the rubber annulus, said rubber annulus being distortable by unequal variation in the pressure exerted thereon by the transmitting members.

EDGAR E. GREVE.